United States Patent Office 3,752,668
Patented Aug. 14, 1973

3,752,668
ORGANIC PHOTOCONDUCTIVE MEMBERS COMPRISING DICYANOMETHYLENE SUBSTITUTED FLUORENE SENSITIZERS
Evan S. Baltazzi, Brookfield, Ill., assignor to Addressograph-Multigraph Corporation, Mount Prospect, Ill.
No Drawing. Continuation-in-part of abandoned application Ser. No. 679,246, Oct. 30, 1967. This application June 5, 1969, Ser. No. 830,879
Int. Cl. G03g 5/06, 13/22
U.S. Cl. 96—1.5
15 Claims

ABSTRACT OF THE DISCLOSURE

Organic photoconductive systems which employ organic polymers containing aromatic or heterocyclic nuclei are combined with amounts of $\pi$ acid type additives for the purpose of extending the spectral response to the visible portion of the spectrum. The sensitizing compounds are dicyanomethylene substituted fluorenes which are added in an amount expressed in moles of sensitizer per 100 moles of the organic photoconductor calculated as the monomer. The amount of sensitizer to be added may range from 0.1 to about 100 moles per 100 moles of organic photoconductor based on the molecular weight of the monomer.

This application is a continuation-in-part of copending application Ser. No. 679,246, filed Oct. 30, 1967, and now abandoned.

BACKGROUND OF THE INVENTION

This invention relates generally to organic photoconductive members of the donor-acceptor type, and in particular, relates to the addition of $\pi$-acid-type acceptors for the purpose of increasing the sensitivity range to electromagnetic radiation in the visible portion of the spectrum.

The use of organic materials as the basis for photoelectrostatic reproducing processes is known. Suitable donor materials may be organic photoconductive polymers containing aromatic or heterocyclic nuclei. Typical of such systems in the prior art is the photoconductive material formed by applying polymerized N-vinylcarbazole (P.V.K.) onto a suitable substrate. Organic photoconductors in general, and the polyvinylcarbazole polymer in particular, have a rather slow response to electromagnetic radiation in the visible range being more sensitive to radiation in the ultraviolet region of the spectrum.

The construction of photoelectrostatic reproducing equipment to process the organic photoconductive type members is greatly simplified if conventional filament-type sources of illumination may be used rather than the mercury vapor-type lamps which are used as a source of ultraviolet radiation.

The broadening of the spectral response of the organic photoconductive donor to include the visible range of the spectrum may be accomplished by the addition of certain additives known as $\pi$-acids.

SUMMARY OF INVENTION

It has been found that members from the class of compounds having the following general formula:

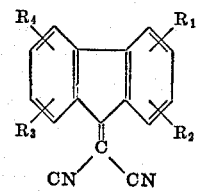

wherein wherein $R_1$, $R_2$, $R_3$, and $R_4$ are each substituents selected from the group consisting of nitro, cyano, halogen, trifluoro methyl, lower alkyl, substituted lower alkyls, lower alkoxy, and hydrogen, when added to the organic photoconductive polymer, give excellent results in extending the visible range of the spectrum to which the photoconductive coating is responsive. The amount of sensitizer is expressed in moles of sensitizer per 100 moles of the photoconductive material based on the molecular weight of the monomer. In the instant invention reference will be had to polyvinylcarbazole as the typical photoconductive donor, however, it is to be understood that the acceptors or sensitizers may be used with other polymeric organic photoconductive donors such as: polystyrenes, polyvinylxylenes, poly-vinylnaphthalene, poly-2-vinylnaphthalene, poly-4-vinylbiphenyl, poly-9-vinylanthracene, poly-3-vinylpyrene, poly-2-vinylquinoline, and polyacenaphthalene. Photoconductive monomeric materials may be used such as: aromatic hydrocarbons: naphthalene, anthracene, benzanthrene, chrysene, p-diphenylbenzene, diphenyl anthracene, triphenylene, p-quaterphenyl, sexiphenyl; heterocycles such as N-alkyl carbazole, thiodiphenylamine, oxadiazoles, e.g. 2,5-bis-(p-aminophenyl)-1,3,4-oxadiazole; triazoles such as 2,5-bis-(p-aminophenyl)-1,3,4-triazole; N-aryl-pyrazolines such as 1,3,5-triphenyl-pyrazoline; hydro imidazoles, such as 1,3-diphenyltetrahydroimidazole; oxazole derivatives such as 2,5-diphenyloxazole-2-p - dimethylamino-4,5-diphenyloxazole; thiazole derivatives such as 2-p-dialkylaminophenyl-methyl-benzothiazole.

It is a general object of this invention to provide an improved organic photoconductive member which is sensitized to respond to the visible region of the spectrum through the use of fluorenylidene malonodinitrile derivatives.

DESCRIPTION OF THE PREFERRED EMBODIMENT

In carrying out the object of the invention, the polymeric material such as poly-N-vinylcarbazole is dissolved in a suitable solvent such as chlorobenzene. The polymer is available under the tradename Luvican sold by Badische Anilin- und Sodafabrik A.G., Ludwigshafen, Germany.

The molecular weight of the polymer can vary over a wide range, such as from 20,000–5,000,000. The preferred molecular weight range for the poly-N-vinylcarbazole is from 200,000 to 2,000,000. To the chlorobenzene solution is then added a sensitizing material coming within the above general formula in an amount which is expressed in moles of sensitizer per 100 moles of the organic polymer. In the case of poly-N-vinylcarbazole the molecular weight is taken on the basis of the molecular weight of the vinylcarbazole monomer. The range is from 0.1 mole to about 100 moles of sensitizer per 100 moles of organic polymer based on the molecular weight of the monomer. The preferred range is from 1 mole to about 35 moles of sensitizer per 100 moles of organic photoconductor. It will be understood that the mole relationship when using an organic photoconductive polymer is based on the weight of the monomer as for example P.V.K. is considered to have a molecular weight of the vinylcarbazole monomer or 193.1. Further, it will be appreciated that the sensitizers of the instant invention can be used with both organic polymeric materials or monomeric organic photoconductive materials.

The fluorenylidene malonodinitrile or the fluorenylidene derivatives of substituted malonodinitriles when combined with the photoconductive material forms a donor-acceptor complex. The improved photoresponse of the system depends on the solubility of the complex in the solvent system that is employed. A wide range of solvents and solvent blends may be used depending on the particular polymer or monomeric material with which the sensitizer combines.

A partial list of solvents are presented below as exemplary of suitable materials but it is not intended to limit the invention to this group: acetone, acetyl acetone, acetyl chloride, amyl acetate, amyl formate, benzaldehyde, butyl acetate, butyl bromide, butyl methacrylate, butyl Cellosolve, butyl stearate, butyrolactone, Cellosolve, cyclohexanone, diacetone alcohol, butyl ether, diethyl ether, dimethylether, dioxane-1,4, ethylbenzoate, ethyl chloride, ethylene oxide, furan, hexanediol, methyl Cellosolve, propyl acetate, propyl benzone, tetrahydrofuran. The preferred solvents are tetrahydrofuran, dioxane-1,4 and cyclohexanone.

The dicyanomethylene fluorenes or dicyanomethylene substituted fluorenes is dissolved in a solvent such as tetrahydrofuran, dioxane-1,4 or cyclohexanone. It may be desirable to combine two or three solvents in the circumstance that it is desired to control the evaporation rate after the solution is cast on the base support during the drying process the manner of combining the ingredients into the solvent or solvent blend is not critical. To the solvent may be added both the sensitizer and the photoconductor or they may be dissolved separately in split mixtures and then combined.

Those photoconductive materials which are not polymerizable require that they be dispersed in a resin binder system. Suitable resin materials generally used for this purpose are well known. As representative binders one may use chlorinated rubbers, styrene-butadiene, silicone resins and polyvinylformal.

The preferred sensitizers are the nitro-substituted dicyanomethylene fluorenes but the other substituents yield derivatives which are excellent sensitizers.

To the solution of polyvinylcarbazole and the sensitizer there may be added additional chlorobenzene in order to adjust the viscosity of the coating solution to the proper viscosity level. The viscosity level will depend on the type of coating equipment used.

Using conventional coating equipment, such as a meniscus coater or trailing blade coater, a thin film of the coating solution is uniformly applied to the conductive substrate. The solvent is then evaporated by forced air drying. The coating solution is applied at a rate such that the dry sheet has a photoconductive layer in the range of 0.15–0.50 mil, the preferred thickness being in the range of 0.2–0.3 mil thickness.

The following is a partial list of the compounds that can be used in carrying out this invention that come within the general formula of the sensitizers of this invention.

9-(dicyanomethylene)-3-nitrofluorene
9-(dicyanomethylene)-2,4-dinitrofluorene
9-(dicyanomethylene)-2,4,7-trinitrofluorene
9-(dicyanomethylene)-2,5-dinitrofluorene
9-(dicyanomethylene)-2,6-dinitrofluorene
9-(dicyanomethylene)-2,7-dinitrofluorene
9-(dicyanomethylene)-2,4,5,7-tetranitrofluorene
9-(dicyanomethylene)-3,6-dinitrofluorene
9-(dicyanomethylene)-2,4-dicyanofluorene
9-(dicyanomethylene)-2,4,7-tricyanofluorene
9-(dicyanomethylene)-2,4,5,7-tetracyanofluorene
9-(dicyanomethylene)-2,4-ditrifluoromethylfluorene
9-(dicyanomethylene)-2,4,7-tritrifluoromethylfluorene
9-(dicyanomethylene)-2,4,5,7-tetratrifluoromethylfluorene
9-(dicyanomethylene)-2,4-dimethylfluorene
9-(dicyanomethylene)-2,4,7-trimethylfluorene
9-(dicyanomethylene)-2,4,5,7-tetramethylfluorene
9-(dicyanomethylene)-2,4-dibutoxyfluorene
9-(dicyanomethylene)-2,4,7-tributoxyfluorene
9-(dicyanomethylene)-2,4,5,7-tetrabutoxyfluorene
9-(dicyanomethylene)-2,4-dichlorofluorene
9-(dicyanomethylene)-2,4,7-trichloro-fluorene
9-(dicyanomethylene)-2,4,5,7-tetrachloro-fluorene The following examples are for purposes of illustration and not intended to limit the invention. In the examples the reference to moles of P.V.K. is based on the molecular weight of the vinylcarbazole monomer 193.1.

EXAMPLE I

The following coating solution was prepared following the general procedure set out above.

|  | G. |
|---|---|
| Polyvinylcarbazole | 5 |
| Chlorobenzene | 64 |
| (2,4,7 - trinitro-9-fluorenylidene)-malonodinitrile (molecular weight=363.24) | [1] 0.075 |
| Methylene chloride | 35 |

[1] 0.8 mole/100 moles P.V.K.

EXAMPLE II

|  | G. |
|---|---|
| Polyvinylcarbazole | 5 |
| Chlorobenzene | 65 |
| 9 - (dicyanomethylene)-2,4-dinitrofluorene (molecular weight=318.24) | [1] 0.0016 |
| Methylene chloride | 35 |

[1] 0.2 mole/100 moles P.V.K.

EXAMPLE III

|  | G. |
|---|---|
| Polyvinylcarbazole | 5 |
| Chlorobenzene | 65 |
| 9 - (dicyanomethylene)-2,4,5,7-tetranitrofluorene (molecular weight=408.24) | [1] 0.073 |

[1] 1.2 moles/100 moles P.V.K.

EXAMPLE IV

|  | G. |
|---|---|
| Polyvinylcarbazole | 5 |
| Chlorobenzene | 65 |
| 9 - (dicyanomethylene)-2,6-dinitrofluorene (molecular weight=318.24) | [1] 0.016 |
| 9-(dicyanomethylene) - 2,4,5,7 - tetracyanofluorene (molecular weight=328.28) | [2] 0.68 |

[1] 0.2 mole/100 moles P.V.K.
[2] 0.8 mole/100 moles P.V.K.

EXAMPLE V

This example follows the formulation of Example I with the exception that 9-(dicyanomethylene)-2,4,7-tricyanofluorene (molecular weight=303.27) was substituted for the 9-(dicyanomethylene)-2,4,7-trinitrofluorene.

EXAMPLE VI

This example follows the formulation of Example I with the exception that 9-(dicyanomethylene)-2,4,7-trimethylfluorene (molecular weight=270.32) was substituted for the 9-(dicyanomethylene)-2,4,7-trinitrofluorene.

EXAMPLE VII

This example is the same formulation as set forth in Example I with the exception that 9-(dicyanomethylene)-2,4,7-trichlorofluorene (molecular weight=331.59) was substituted for the 9-(dicyanomethylene)-2,4,7-trinitrofluorene.

EXAMPLE VIII

|  | G. |
|---|---|
| Chrysene | 5 |
| Polyvinyl formal | 10 |
| Tetrahydrofuran | 30 |
| Dioxane-1,4 | 30 |
| Cyclohexanone | 30 |
| 9-(dicyanomethylene)-2,4-dinitrofluorene | [1] 2.45 |

[1] 35 moles acceptor/100 moles donor.

EXAMPLE IX

|  | G. |
|---|---|
| N-ethylalkyl carbazole | 5 |
| Silicone resin | 2.5 |
| Tetrahydrofuran | 30 |
| Dioxane | 40 |
| Cyclohexanone | 30 |
| 9-(dicyanomethylene)-2,4-dinitrofluorene | [1] 1.0 |
| 9-(dicyanomethylene)-2,4,5,7-tetracyanofluorene | [1] 1.0 |

[1] 24 moles acceptor/100 moles donor.

EXAMPLE X

|  | G. |
|---|---|
| Polyacenapththalene | 5 |
| Tetrahydrofuran | 30 |
| Dioxane-1,4 | 40 |
| Cyclohexanone | 30 |
| 9-(dicyanomethylene)-2,4,5,7-tetranitrofluorene | [1] 12 |

[1] 100 moles acceptor/100 moles donor.

EXAMPLE XI

|  | G. |
|---|---|
| Benzanthrene | 5 |
| Styrene-butadiene resin | 5 |
| Tetrahydrofuran | 50 |
| Cyclohexanone | 50 |
| 9-(dicyanomethylene)-2,4,7-trinitrofluorene | [1] 1.6 |

[1] 20 moles acceptor/100 moles donor.

EXAMPLE XII

|  | G. |
|---|---|
| Triphenylene | 1 |
| Styrene-butadiene resin | 10 |
| Dioxane | 50 |
| Cyclohexane | 50 |
| 9-(dicyanomethylene)-2,4-dinitrofluorene | [1] .16 |

[1] 10 moles acceptor/100 moles donor.

In each of the foregoing examples the full response in the visible range was substantially increased over the unsensitized formulation.

The photoelectrostatic member of Example I, when exposed to electromagnetic radiation in the visible range, such as a Sylvania filament lamp in a quartz envelope, produced a measured rate voltage drop of 55.5 volts per foot-candle-second from a saturation voltage level of about 800 volts to a voltage level of 300 volts. In the circumstance that the photoelectrostatic member of Example I was prepared omitting the malonodinitrile derivative, the voltage drop in volts per foot-candle-second from a saturation voltage of 800 volts was 0.13 volt per foot-candle-second down to the same level of 300 volts.

The photoelectrostatic members prepared using the other sensitizers gave similar increased photoresponse when added to the polyvinylcarbazole material.

What is claimed is:

1. A photoelectrostatic member comprising a conductive base support coated with a photoconductive film comprising an organic photoconductive polymer of the electron donor type and a sensitizer having the formula:

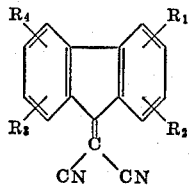

wherein $R_1$, $R_2$, $R_3$ and $R_4$ are each substituents selected from the group consisting of nitro, cyano, halogen, trifluoromethyl, lower alkyl, substituted lower alkyls, lower alkoxy and hydrogen.

2. A photoelectrostatic member as claimed in claim 1 in which the amount of sensitizer present ranges from 0.1 mole to 100 moles per 100 moles of organic photoconductive donor.

3. A photoelectrostatic member as claimed in claim 1 in which the polymer is polyvinylcarbazole.

4. The photoelectrostatic member as claimed in claim 1 in which the sensitizer is 9-(dicyanomethylene)-2,4,7-trinitrofluorene.

5. The photoelectrostatic member as claimed in claim 1 in which the sensitizer is 9-(dicyanomethylene)-2,7-dinitrofluorene.

6. The photoelectrostatic member as claimed in claim 1 in which the sensitizer is 9-(dicyanomethylene)-2,4,5,7-tetranitrofluorene.

7. The photoelectrostatic member as claimed in claim 1 in which the sensitizer is 9-(dicyanomethylene)-2,4,7-trichlorofluorene.

8. The photoelectrostatic member as claimed in claim 1 in which the sensitizer is 9-(dicyanomethylene)-3-nitrofluorene.

9. The photoelectrostatic member as claimed in claim 1 in which the sensitizer is 9-(dicyanomethylene)-2,4,7-tricyanofluorene.

10. The photoelectrostatic member as claimed in claim 1 in which the sensitizer is 9-(dicyanomethylene)-fluorene.

11. The photoelectrostatic member as claimed in claim 3 in which the molecular weight of the polyvinylcarbazole polymer is in the range of 200,000–5,000,000.

12. A photoelectrostatic member comprising a conductive base support coated with a photoconductive film comprising an organic photoconductor of the electron donor type and a sensitizer having the formula:

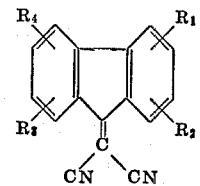

wherein $R_1$, $R_2$, $R_3$ and $R_4$ are each substituents selected from the group consisting of nitro, cyano, halogen, trifluoromethyl, lower alkyl, substituted lower alkyls, lower alkoxy and hydrogen.

13. A photoelectrostatic member comprising a conductive base support coated with a photoconductive film comprising an organic photoconductor of the electron donor type sensitized with a 9-(dicyanomethylene)-polynitrofluorene compound.

14. A photoelectrostatic member comprising a conductive base support coated with a photoconductive film comprising an organic photoconductor of the electron donor type sensitized with a compound selected from the group consisting of
a 9-(dicyanomethylene)-monoitrofluorene,
a 9-(dicyanomethylene)-polynitrofluorene,
a 9-(dicyanomethylene)-monocyanofluorene, and
a 9-(dicyanomethylene)-polycyanofluorene.

15. The method of making a reproduction comprising the steps of applying a sensitizing charge to an organic photoconductive medium of the electron donor type sensitized with a compound having the formula:

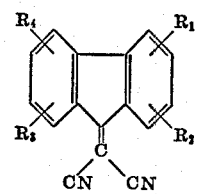

where $R_1$, $R_2$, $R_3$ and $R_4$ are each substituents selected from the group consisting of nitro, cyano, halogen, trifluoromethyl, lower alkyl, substituted lower alkyls, lower alkoxy and hydrogen, said compound being present in an amount ranging from 10 moles to 35 moles per 100 moles of organic photoconductor taken as the weight of the monomer;

exposing said charged member to a pattern of light and shadow comprising electromagnetic radiation in the visible range to produce a latent image thereon; and applying electroscopic powder to produce a material image corresponding to said pattern of light and shadow.

References Cited

UNITED STATES PATENTS

| | | | |
|---|---|---|---|
| 3,159,483 | 12/1967 | Behmenberg et al. | 96—1 |
| 3,232,755 | 1/1966 | Hoegl et al. | 96—1 |
| 3,257,207 | 6/1966 | Schlesinger et al | 96—1.5 |
| 3,287,119 | 11/1966 | Hoegl | 96—1.5 |
| 3,408,190 | 10/1968 | Mammino | 96—1.5 |

CHARLES E. VAN HORN, Primary Examiner

U.S. Cl. X.R.

96—1 PC

Notice of Adverse Decision in Interference

In Interference No. 98,754 involving Patent No. 3,752,668, E. S. Baltazzi, ORGANIC PHOTOCONDUCTIVE MEMBERS COMPRISING DICYANOMETHYLENE SUBSTITUTED FLUORENE SENSITIZERS, final judgment adverse to the patentee was rendered Mar. 26, 1976, as to claim 3.

[*Official Gazette June 22, 1976.*]